US 9,394,118 B2

(12) United States Patent
Fenile et al.

(10) Patent No.: US 9,394,118 B2
(45) Date of Patent: Jul. 19, 2016

(54) METHOD AND DEVICE FOR DISCHARGING PIECE GOODS FROM A CONVEYING APPARATUS

(71) Applicant: Ferag AG, Hinwil (CH)

(72) Inventors: Roberto Fenile, Wetzikon (CH); Christian Bonadimann, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/641,737

(22) Filed: Mar. 9, 2015

(65) Prior Publication Data

US 2015/0259145 A1    Sep. 17, 2015

(30) Foreign Application Priority Data

Mar. 11, 2014    (CH) .......................... 364/14

(51) Int. Cl.
| | |
|---|---|
| *B65G 47/61* | (2006.01) |
| *B65G 19/02* | (2006.01) |
| *B65G 17/12* | (2006.01) |
| *B65G 47/82* | (2006.01) |

(52) U.S. Cl.
CPC .............. *B65G 47/61* (2013.01); *B65G 17/12* (2013.01); *B65G 19/025* (2013.01); *B65G 47/82* (2013.01)

(58) Field of Classification Search
CPC .... B65G 17/12; B65G 17/323; B65G 19/025; B65G 47/36; B65G 47/61; B65G 47/82; B65G 47/841; B65G 47/842
USPC ............ 198/867.06, 798, 799, 803.8, 867.11, 198/470.1, 474.1, 482.1, 483.1, 465.1, 198/465.4, 476.1, 477.1, 867.01, 867.08
See application file for complete search history.

(56) References Cited

U.S. PATENT DOCUMENTS

| | | | | |
|---|---|---|---|---|
| 2,936,059 | A * | 5/1960 | Ichiro ..................... | B41F 17/22 101/40 |
| 3,866,737 | A * | 2/1975 | Simon .................. | B65B 35/405 198/470.1 |
| 5,503,264 | A * | 4/1996 | Eberle .................... | B65G 47/29 198/343.1 |
| 6,425,478 | B1 * | 7/2002 | Eberle .................... | B65G 23/16 198/795 |
| 6,607,068 | B1 | 8/2003 | Walther et al. | |
| 2014/0291124 | A1 * | 10/2014 | Fenile .................... | B65G 47/82 198/617 |

FOREIGN PATENT DOCUMENTS

| | | |
|---|---|---|
| CH | 166046 | 3/1934 |
| DE | 40 42 375 | 12/1991 |

(Continued)

*Primary Examiner* — Leslie A Nicholson, III
*Assistant Examiner* — Keith R Campbell
(74) *Attorney, Agent, or Firm* — Rankin, Hill & Clark LLP

(57) ABSTRACT

Conveying apparatus including a plurality of conveying vehicles that can be moved along a movement path by the force of gravity independently of one another for conveying piece goods. The conveying apparatus also includes a discharging device for discharging piece goods from the conveying vehicles to a receiving device as well as an entraining device with a plurality of actively driven entrainment devices. The conveying vehicles include contact elements for producing a guiding contact with the entrainment devices. The entraining device supplies the conveying vehicles to a discharging region of the discharging device while exerting a holding-back contact with the contact elements and guides the conveying vehicles out of the discharging region again while exerting an entraining contact with the contact elements.

16 Claims, 5 Drawing Sheets

(56) References Cited

FOREIGN PATENT DOCUMENTS

| | | |
|---|---|---|
| EP | 0 633 212 | 1/1995 |
| EP | 0 856 480 | 8/1998 |
| EP | 1 169 249 | 1/2002 |
| EP | 2 196 415 | 6/2010 |
| EP | 2 301 867 | 3/2011 |
| WO | 99/33722 | 7/1999 |
| WO | 99/33731 | 7/1999 |

* cited by examiner

METHOD AND DEVICE FOR DISCHARGING PIECE GOODS FROM A CONVEYING APPARATUS

BACKGROUND OF THE INVENTION

1. Field of the Invention

The invention relates to the field of conveyor technology and concerns a conveying apparatus including a plurality of conveying vehicles that can be moved along a movement path independently of one another for conveying piece goods, having contact elements for producing a guiding contact with entrainment means. In addition, the conveying apparatus includes a processing device for performing a processing step on the piece goods as well as an entraining device with a plurality of entrainment means that can be moved along a movement path by an entraining drive. In the conveying direction, the processing device realizes an inlet region, a processing region and an outlet region.

2. Description of Related Art

Conveying devices with rail-guided conveying vehicles, which are guided independently of one another along guide rails rollers or sliding elements, are known in the art. These types of conveying devices are developed, for example, as gravity conveyors. In the case of such devices, the conveying vehicles are moved by an entrainment means to a higher potential level, from where they are moved by the force of gravity along the guide rails in the direction of a lower potential level. The term "potential level" relates to the potential energy of the conveying vehicles in the gravitational field.

The conveying path or the guide rail includes an ascent in a corresponding manner when conveying from a lower to a higher potential level. The conveying path or the guide rail comprises a descent in a corresponding manner when conveying from a higher to a lower potential level.

Holding bodies, which receive and hold the piece goods to be conveyed, are in each case coupled to the conveying vehicles. The piece goods are thus conveyed by the conveying vehicles along a conveying section that is predetermined by the guide rail.

The advantage of the named conveying devices is that the conveying vehicles can be moved individually, i.e. independently of one another, along a conveying section. This allows, for example, conveying vehicles filled with piece goods to be buffered along the conveying section.

EP 0856 480 B1 describes a conveying device having a plurality of rail-guided conveying vehicles. The conveying vehicles include rollers. The basic body of the conveying vehicle includes two limbs. Two rollers, which are arranged offset diagonally opposite, are fastened on each of the sides of the vehicle limbs associated with one another. The rollers are arranged mutually spaced apart in the running direction of the vehicles limbs such that a flat guide rail can be located between the rollers. The rollers roll along the two flat sides of the running rail that are located opposite one another.

EP 1 169 249 B1 describes a method and a device for conveying piece goods. The piece goods are loaded on holding means, are conveyed held by the holding means and are unloaded again from the holding means. For loading or unloading the holding means, the piece goods are pushed into the holding means or out of the holding means transversely with respect to the conveying direction. The pushing movement is effected parallel to the longitudinal axis of the piece goods by an object guiding means.

Processing steps, which require guided movement of the conveying vehicles, are often carried out along the conveying section of a conveying apparatus. Such a processing step, for example, is the discharging of the piece goods to a receiving device. Consequently, the conveying vehicles have to be supplied to the discharging device in a guided and spaced apart manner. Controlled discharging of the piece goods from the conveying vehicles to the receiving device is only possible in this way.

SUMMARY OF THE INVENTION

It is consequently an object of the present invention to propose a conveying apparatus with a processing device, in particular a discharging device, which allows the conveying vehicles to be supplied into the processing device at a controlled speed.

According to a further object, the conveying apparatus is to enable the conveying vehicles to be supplied at defined intervals and at a defined speed for the purposes of processing, in particular discharging piece goods in the processing or discharging device.

It is additionally a further object of the present invention to utilize existing devices of the conveying apparatus where possible in order to guide the conveying vehicles at a controlled speed into the processing device. This means that existing devices, which are required anyway, are to obtain a further function.

A further object of the present invention is additionally to propose means for releasing the piece goods from the holding bodies of the conveying vehicles.

At least one of the objects is achieved by a conveying apparatus that is developed in such a manner that the movement path of the conveying vehicles and of the entrainment means toward the inlet region extends along a descent such that, by means of their contact elements, the conveying vehicles can be held back from preceding entrainment means while forming a holding-back contact and can be moved in the direction of the processing region in a synchronous manner with the entrainment means;

the movement path of the conveying vehicles and of the entrainment means in the outlet region extends along an ascent such that, by means of their contact elements, the conveying vehicles can be moved away from following entrainment means from the processing region while forming an entraining contact.

The movement path of the conveying vehicles and entrainment means in particular in the inlet region extends along a descent. The term "descent" means that the movement path includes a directional component and the conveying vehicles or entrainment means that are moved along the movement path include a movement component in the direction of the force of gravity. The descent can be sloping, curved or vertical.

The conveying vehicles are moved toward the inlet region and in the inlet region in particular by being supported by the force of gravity. Holding-back contact means that the entrainment means holds back or brakes the conveying vehicle by means of the holding-back contact. This means that the conveying vehicle is prevented from moving into the inlet region at a higher speed that is predetermined by the effect of gravity.

Ascent means that the movement path includes a directional component and the conveying vehicles or entrainment means, which are moved along the movement path comprise a movement component against the direction of the force of gravity. The ascent can be sloping, curved or vertical.

Entraining contact means the entrainment means drives the conveying vehicle by means of the entraining contact, in particular against the effect of the force of gravity.

The conveying vehicles and the entrainment means can be moved in particular toward the inlet region along a movement path which extends in an identical manner. The conveying vehicles and the entrainment means can be moved in particular in the inlet region along a movement path that extends in an identical manner.

The conveying vehicles and the entrainment means can be moved in particular in the processing region along a movement path that extends in an identical manner. The conveying vehicles and the entrainment means can be moved in particular in the outlet region along a movement path that extends in an identical manner. The movement path which extends in an identical manner can be a movement path that extends in parallel.

The conveying vehicles are realized so as to be movable along a movement path independently of one another. The conveying vehicles are realized so as not to be chainable together. The conveying vehicles include holding bodies for receiving and supporting piece goods. The holding bodies can be holding clips for temporarily holding the piece goods in a clamping manner.

The conveying apparatus according to the invention can include conveying that is operated by way of the force of gravity. In the case of such apparatuses, driven by the force of gravity, the conveying vehicles are moved from a higher potential level along a movement path with descent to a lower potential level. For this purpose, the conveying vehicles can be moved in a prior manner by means of driven entrainment means, similarly to a climbing aid, along a movement path with ascent from a lower to a higher potential level.

A method for carrying out a processing step on an item of piece goods, in particular for discharging piece goods from a conveying apparatus to a receiving device, is carried out in particular with a conveying apparatus according to the present description. The method includes entrainment means and conveying vehicles with piece goods are moved along an identically extending movement path into the inlet region of a processing device, wherein the conveying vehicles that follow the entrainment means move into the inlet region in a guided manner at the speed of the entrainment means while forming a holding-back contact;

the entrainment means are moved away from the following conveying vehicles in the inlet region and/or in the processing region while cancelling the holding-back contact;

a processing step is carried out on the piece goods in a processing region of the processing device following the inlet region;

the entrainment means are moved in each case toward the preceding conveying vehicles while forming an entraining contact;

following the processing region, the conveying vehicles are moved further in a guided manner by the entrainment means at the speed of the entrainment means by means of the entraining contact.

The holding-back and entraining contact is produced on the conveying vehicles in each case by means of contact elements. The entrainment means are driven independently of the force of gravity. The entrainment means are driven in a controlled manner by the entraining drive. The entrainment means include a speed that is predetermined by a control device.

The processing step can be an arbitrary method step on the piece goods item, such as addressing the piece goods item or weighing the piece goods item. According to an embodiment of the invention, the processing device is a discharging device for discharging piece goods from the conveying vehicles to a receiving device. The processing region corresponds to a discharging region. The processing step relates to the discharging of the piece goods to the receiving device. The discharging of the piece goods is realized in the discharging region.

The conveying vehicles, which following the discharging region no longer convey piece goods, are moved along an ascent in the outlet region by the entrainment means against the direction of the force of gravity. The conveying vehicles are moved in the inlet region, in the processing region and in the outlet region along a movement path, in particular along a curved movement path, from a higher potential level in the inlet region to a lower potential level in the processing region and from the lower potential level in the processing region to a higher potential level following the processing region, in particular in the outlet region.

A further development of the method includes conveying vehicles that follow entrainment means move into the inlet region in a guided manner at the speed of the entrainment means while forming a holding-back contact;

the conveying vehicles are brought together with releasing bodies in the inlet region while forming a guiding contact with the releasing bodies;

the releasing bodies move the conveying vehicles into the discharging region in a guided manner at the speed of the releasing bodies by means of the guiding contact;

the entrainment means are moved more rapidly than the releasing bodies such that in the inlet region the entrainment means are moved in each case away from the following conveying vehicle in the direction of movement while terminating the holding-back contact;

the entrainment means are moved in each case toward the preceding conveying vehicle and are realizing an entraining contact;

following the discharging region, the conveying vehicles are forwarded in a guided manner by means of the entrainment means at the speed of the entrainment means by means of the entraining contact.

The discharging device includes in particular a plurality of releasing bodies that can be moved along a closed movement path. The movement path of the releasing bodies is in particular a closed path.

The releasing bodies serve among other things for releasing the piece goods from the holding bodies. The releasing bodies are realized as ejecting bodies. The ejecting bodies serve among other things for ejecting the piece goods from the holding bodies.

The inlet region defines that movement section up to the discharging region in which the releasing bodies coincide with the entrainment means and the conveying vehicles and are moved along an identically extending, in particular common, movement path in the direction of the discharging region.

The outlet region defines that movement section following the discharging region, in which the releasing bodies with the entrainment means and the conveying vehicles are moved along an identically extending, in particular common, movement path away from the outlet region. The end of the outlet region is defined by the ejecting body and the conveying vehicles moving apart from one another.

According to a further development of the invention the releasing bodies can be moved with the conveying vehicles and the entrainment means along an identically extending movement path through the inlet region, the discharging region and the outlet region. The identically extending movement path is a common movement path.

The releasing bodies include a releasing member, such as an ejecting member, for acting upon the piece goods item for the purposes of releasing or ejecting the piece goods item from the holding body. The releasing member includes a releasing body, such as an ejecting element, which can be brought into direct operative contact with the piece goods item. The ejecting element is designed for the purpose of ejecting the piece goods item from the support of the conveying vehicle.

The releasing body includes a contact body for producing a guiding contact with the conveying vehicle or with a piece goods item that is held by the conveying vehicle for the guided movement of the conveying vehicle into the discharging region at the speed of the releasing body.

The contact body is realized by the releasing element. According to a further development of the invention the releasing element realizes a receiving means, such as a cavity. The releasing element can be brought together with the conveying vehicle in such a manner in the inlet region that the piece goods item held by the conveying vehicle is positioned in the receiving means of the releasing element. The releasing element engages over the piece goods item at the side when viewed transversely with respect to the direction of movement. The engaging over is effected outside the range of influence of the holding body, i.e. to the side of the holding body when viewed in the direction of movement.

By engaging over the piece goods item at the side, the releasing element realizes a holding-back and entraining guiding means for the piece goods item and in a corresponding manner also for the conveying vehicle.

Thus, the piece goods item with the conveyor vehicle is retained by the releasing element in the inlet region from the moment when the entrainment means speeds away from the following conveying vehicle and is moved at the speed of the releasing body into the discharging region.

The discharging device includes driving means for driving the releasing bodies. The driving means are coupled with the entraining drive. The coupling includes transmission gearing. The transmission gearing is designed such that the releasing bodies are moved along the identically extending movement path more slowly than the entrainment means.

According to a further development of the invention, the discharging device includes a releasing wheel module that can be driven about a rotational axis. The releasing bodies are arranged on the releasing wheel module, in particular around the rotational axis thereof.

The releasing wheel module is rotatably mounted on a supporting body of the discharging device. The releasing bodies are arranged on the releasing wheel module in a circular manner around the rotational axis thereof. The releasing bodies are arranged along the circumference of the releasing wheel module. The releasing bodies include a radial alignment on the releasing wheel module. The releasing wheel module can include a rotatable wheel plate or can be realized as such. The releasing wheel module can include two rotatable wheel plates that are spaced apart from one another and are coupled rigidly together. The releasing bodies are fastened on the wheel plate or on the wheel plates in the abovementioned manner. The releasing wheel module is driven by means of the abovementioned driving means. Where the piece goods are received in a pulse-controlled manner by the receiving device, the movement of the releasing bodies in the discharging region is pulse-synchronous with the receiving pulse of the receiving device.

The discharging device includes a stationary control linkage for activating the releasing bodies or the associated releasing member. The control linkage is realized as a cam disc. The stationary control linkage is arranged in the discharging region. The control linkage can be moved in a mechanical manner and as a result can be connected or disconnected. As a result, in dependence on the switching state, the control linkage can act upon the releasing bodies or upon the releasing members and trigger the discharging of the piece goods or not.

To this end, the control linkage can be arranged in the discharging region so as to be pivotable by means of a pivot joint. The control linkage is fastened so as to be pivotable on a stationary component, such as a supporting body, of the discharging device.

The control linkage is pivotable between an active or non-active position by means of the stroke of an actuating cylinder, which is pivotably connected to the control linkage. The actuating cylinder can be a hydraulic or pneumatic cylinder. The actuating cylinder is mounted on a stationary component, such as a supporting body, of the discharging device. A control element, which cooperates with the control linkage and by means of which a releasing movement is triggered, can be arranged on the releasing member. The control element of the releasing body can, for example, roll along the curved guiding surface of a control linkage, which is realized as a cam disc or can slide beyond it.

As a result of the releasing movement of the releasing member, a releasing force is exerted by the releasing member onto the piece goods item in the holding body. If the releasing member is an ejecting member, it can include a guiding cylinder, which is guided in a sliding manner in a guide bushing of the releasing body, for the guided ejection of the piece goods item from the holding body. In addition, a resetting body, which exerts a resetting movement, which opposes the releasing movement, on the releasing member, can be provided outside the range of influence of the control linkage. The releasing member of a releasing body, which is arranged on a releasing wheel module, can exert a releasing force, in particular an ejecting force, onto the piece goods item as a result of a linkage-controlled movement radially outward.

According to this embodiment, in a corresponding manner a resetting body exerts a radially inwardly acting resetting force on the releasing member. The discharging region defines that conveying section up to and including the releasing of the piece goods item, along which the releasing member exerts an ejecting stroke onto the piece goods item within the range of influence of the control linkage.

The releasing wheel module is driven such that the releasing bodies are moved along the identically extending movement path through the inlet, discharging and outlet region at a slower speed than the entrainment means.

In addition, the arrangement and movement of the releasing bodies and entrainment means are matched to one another such that a releasing body at the start of the inlet region in each case coincides with a conveying vehicle that is held back by an entrainment means, such that the releasing element engages over the piece goods item, which is entrained in the conveying vehicle, by way of its receiving means.

The entraining device includes an elongated flexible driving body that is driven in a circulating manner by the entraining drive. The entrainment means are mounted or fastened in particular on the driving body. The entrainment means are mounted on the driving body in particular at defined spacings with regard to one another. The spacings can be equal. The driving body is realized in particular in an endless manner. The driving body can be, for example, a chain, a belt, such as a toothed belt, a cable, a band or a strap. The entrainment means realize in particular a contact element, such as, for example, an entraining finger. The contact element realizes in particular a first contact zone for realizing an entraining contact with the conveying vehicle.

The contact element realizes a second contact zone for realizing a holding-back contact with the conveying vehicle. The contact zone can be a contact surface, a contact point or a contact line. As a result of the conveying vehicle exerting a bearing force onto the entrainment means or as a result of the entrainment means exerting an entraining force on the conveying vehicle, leverage forces act on the entraining finger.

If the driving body is flexibly developed, it yields to the leverage forces as a result of an evasive movement and the entraining finger tilts away. As a result of the entraining finger tilting away, the conveying vehicle can slip off the entraining finger such that the guiding contact is lost. Consequently, the flexible driving body can be guided in a guiding device prior to the inlet region.

The flexible driving body can also be guided in a guiding device following the outlet region. The flexible driving body is guided in the inlet region, discharging region and outlet region in particular by a drive wheel around which the flexible driving body is guided.

The guiding device can realize, for example, a guide channel for the driving body. The guiding device can be made from plastics material. The guiding device can be realized as a guide rail with a guiding channel. As a result of guiding the driving body in the guiding device, the entraining finger is prevented from yielding and consequently tilting away. The holding clip of the conveying vehicle includes at least two clip limbs for holding the piece goods item in a clamping manner. At least one clip limb, preferably both clip limbs are movable.

The piece goods can be introduced into the holding clip or removed from the holding clip in particular by spreading the clip limbs. The spreading of the clip limbs can be triggered by the piece goods item that is pressed into holding clip or ejected from the holding clip. The holding clips are closed again as a result of resetting forces acting on them. The holding clips and/or the clip limbs are realized in a resilient manner. The holding clips and/or the clip limbs can be made of spring steel or can include elements made of spring steel.

The holding clips can also receive in a clamping manner carrying brackets, on which, in turn, piece goods are conveyed in a suspended manner. The piece goods can be suspended in the carrying brackets. The piece goods are, for example, elongated bodies with a longitudinal axis. The piece goods are in particular rigid. The piece goods include a rotationally symmetrical form. The rotationally symmetrical form can be a cylindrical form, such as a circular cylindrical form. The pieces goods item can include conical portions or can be completely conical. The piece goods can be, for example, preforms, cartridges, glasses, bottles, bushings, foodstuffs such as sausages, cardboard packaging such as boxes of biscuits, bar goods such a sweets, tubes or cigars. The piece goods can also be in each case a plurality of individual goods which, for example, are combined in one common container, such as a bag, in particular are combined to form a collection.

The movement path of the conveying vehicles in the conveying apparatus is a closed path. The conveying apparatus is realized in a corresponding manner as a round circuit. The closed path, however, can certainly include branches, such as points, which allow the conveyor vehicles to move over different conveying sections.

The movement path of the conveying vehicles can include a curved development, in particular a curved path, in the region of the discharging device. The movement path can extend in the direction of movement of the conveying vehicles from a higher potential level in the inlet region to a lower potential level in the discharging region. The movement path can extend in the direction of movement of the conveying vehicles from a lower potential level in the discharging region to a higher potential level in the outlet region.

The conveying vehicles are moved in the discharging device in a corresponding manner along the curved movement path under the influence of the force of gravity from a higher potential level in the inlet region to a lower potential level in the discharging region. The conveying vehicles and the entrainment means are moved along an identically extending movement path to the inlet region. The conveying vehicles, in this case, are held back in each case from preceding entrainment means by means of their contact elements whilst forming a holding-back contact and are moved in a synchronous manner with the entrainment means to the inlet region. The entrainment means consequently guide the conveying vehicles at a controlled speed to the inlet region.

The releasing bodies are also moved to the inlet region. At the start of the inlet region the individual releasing bodies coincide in each case in a pulse-synchronous manner with an entrainment means and consequently with a conveying vehicle that is entrained in a synchronous manner by that entrainment means. Releasing bodies and conveying vehicles are thus combined in pairs while forming the guiding contact.

The guiding contact is realized in each case between the piece goods item and the releasing body. In this way, as already mentioned, the releasing body is able to engage over the piece goods item at the side by way of its recess and thus realize a holding back and entraining guiding means for the piece goods item and consequently indirectly also for the associated conveying vehicle.

The releasing bodies then guide the conveying vehicles into the discharging region in each case by means of the guiding contact. The releasing bodies and conveying vehicles, in this case, are moved toward the discharging region in a synchronous manner in each case in pairs. The entrainment means are moved along the common movement path more rapidly than the releasing bodies and the conveying vehicles guided by the releasing bodies. Consequently, the more rapidly moving entrainment means are moved away from the following conveying vehicle in the direction of movement in each case while terminating the holding-back contact.

The entrainment means are moved as described in more detail below toward a preceding conveying vehicle. As soon as the entrainment means contact the contact element of the preceding conveying vehicle, the entrainment means realize an entraining contact with the contact element. The conveying vehicle reaches the lowest potential level in the discharging device in particular in the discharging region. In the outlet region, the movement path proceeding from the lowest potential level leads to a higher potential level again.

The piece goods item can be discharged from the conveying vehicle to the receiving device by means of the releasing body in the discharging region. Once the piece goods item has been discharged, the empty conveying vehicle is then no longer guided by the releasing body as the corresponding guiding contact by means of the piece goods item is missing. The conveying vehicle in fact stays in the discharging region until an entrainment means catching up in the direction of movement realizes an entraining contact with the contact element of the conveying vehicle.

The conveying vehicle is entrained by the entrainment means and is entrained or driven by the entrainment means through the outlet region, which follows the discharging region, and is moved from the lower potential level in the discharging region to a higher potential level. The conveying vehicle is moved in a corresponding manner at the speed of the entrainment means. Following the discharging region, the releasing body is moved out of the outlet region toward the inlet region again.

In the event of a piece goods item not being discharged and being moved by the conveying vehicle into the outlet region, the conveying vehicle remains in guiding contact with the releasing body by means of the piece goods item. In a corresponding manner, the conveying vehicle is moved in the outlet region at the speed of the releasing body and in a pairing with the releasing body.

The arrangement and movement of the releasing bodies and entrainment means are matched to one another then in such a manner that the entrainment means catches up with the preceding conveying vehicle, which is guided in the outlet region by the releasing body, while forming an entraining contact when the releasing body is moved out of the outlet region whilst terminating the guiding contact with the piece goods item. When the releasing body is moved out of the outlet region, the engagement of the releasing element over the piece goods item and, consequently, the guiding is in particular eliminated.

The movement path of the conveying vehicles is realized in particular by a guide rail, along which the conveying vehicles are moved. The guide rail extends in particular along the inlet, discharging and outlet region through the discharging device. The guide rail can be a round profile or a polygonal profile, such as a hexagonal profile. The guide rail can be made of metal, such as steel or aluminium, or of plastics material. The guide rail is in particular connected to a supporting structure, which is not explained in any more detail at this point, in particular by means of supporting means. The guide rail in particular realizes running surfaces or sliding surfaces for the conveying vehicles in particular on its outside periphery. If the conveying vehicle rolls or slides along a running or sliding surface on the outside periphery of the guide rail, the conveying vehicle is designated as an outside runner.

The conveying vehicles include rollers for rolling along the guide rail. The conveying vehicles can also include sliding elements for sliding along the guide rail. The conveying vehicles include, as mentioned, contact elements for producing a guide contact with the entrainment means. The contact elements realize, for example in each case a first contact zone for producing a holding-back contact. The holding-back contact is characterized in that the contact element of the conveying vehicle and consequently also of the conveying vehicles is trailing compared to the contact element of the entrainment means.

The contact elements realize, for example in each case a second contact zone for producing an entraining contact. The entraining contact is characterized in that the contact element of the conveying vehicle and consequently of the conveying vehicles is leading compared to the contact element of the entrainment means. A contact element on the conveying vehicle can realize both a first contact zone for the holding-back contact and a second contact zone for the entraining contact.

The contact element can be a contact pin, a contact cam, a contact journal or a contact mandrel. When viewed in the direction of movement of the conveying vehicle, the contact element stands out, for example, to the side of the conveyor vehicle.

The contact element can be an integral part of the conveying vehicle or of the basic body thereof. According to a specific embodiment, the conveying vehicle includes a basic body on which running rollers or sliding elements are fastened for rolling along or sliding along a guide rail. The holding body is mounted on the basic body.

According to a further development, the conveying vehicle includes a first and second vehicle limb as well as a connecting portion that connects the two vehicle limbs together and these together realize in particular the basic body. Rollers or sliding elements are fastened on the vehicle limbs. The holding body is mounted on the connecting portion. The two vehicle limbs and the connecting portion enclose a rail receiving space that is open on one side for receiving a guide rail.

The conveying apparatus according to the invention can be realized as an overhead conveyor. In the case of an overhead conveyor, the piece goods are conveyed at least in portions in a suspended manner. In the case of overhead conveying, the holding body with the piece goods item is arranged below the guide rail with reference to the direction of the force of gravity.

The conveying apparatus includes a control device for controlling the entraining device and the discharging device as well as, where applicable, the receiving device. The entraining drive is controlled by means of the control device. The entraining device fulfils two objects according to the present invention. It moves the conveying vehicles toward the discharging region at defined spacings with respect to one another as well as at a defined, i.e. controlled, speed. In addition, the entraining device serves as a climbing aid for the conveying vehicles from a lower to a higher potential level following the discharging region.

BRIEF DESCRIPTION OF THE DRAWINGS

The object of the invention is described in more detail below by way of a preferred exemplary embodiment which is shown in the accompanying drawings, in which, in each case in a schematic manner.

DETAILED DESCRIPTION OF THE INVENTION

In principle, identical parts in the Figures are provided with identical references. The described exemplary embodiment stands as an example of the object of the invention and has no limiting effect.

Figure 1:
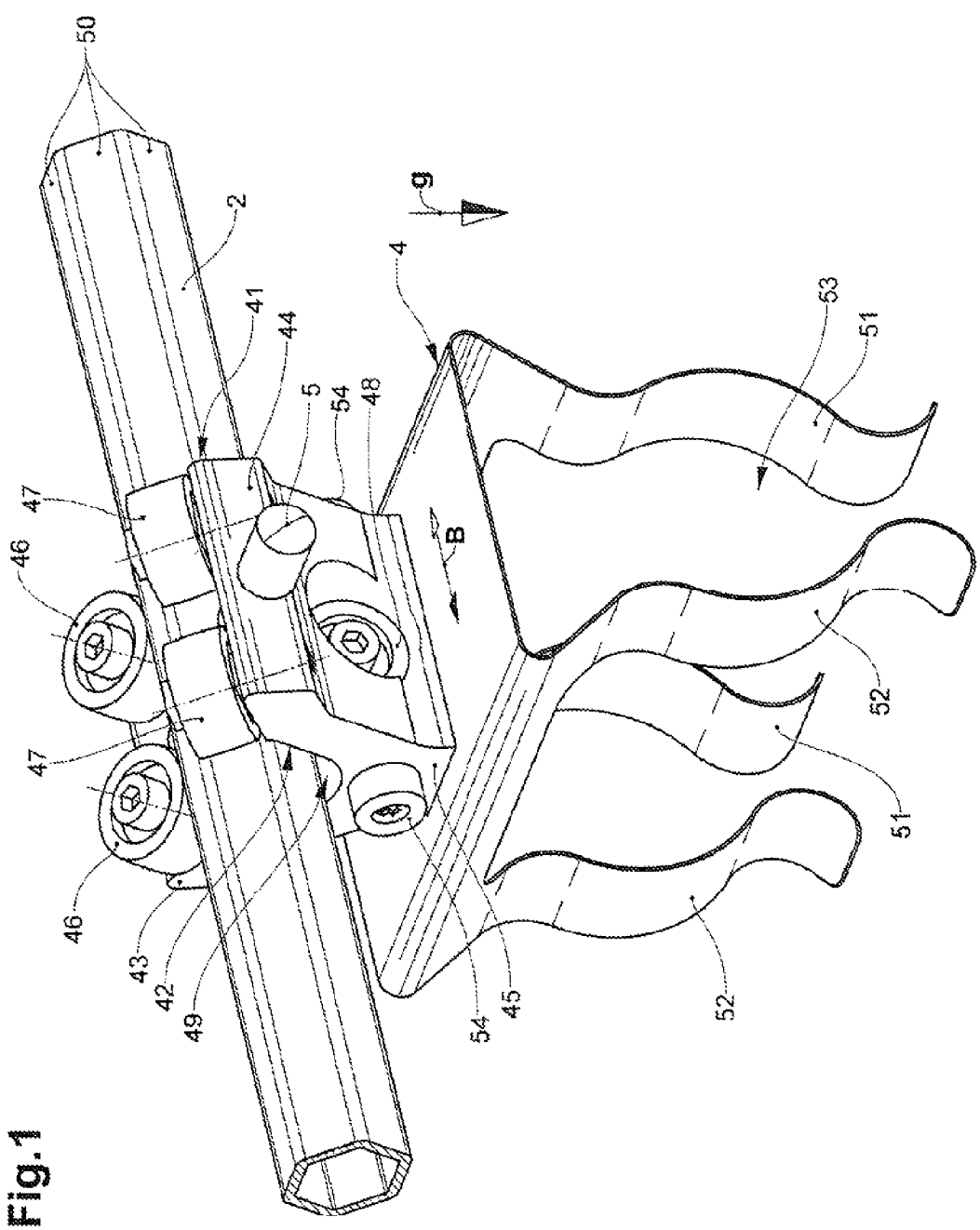
FIG. 1 shows a perspective view of a rail-guided conveying vehicle.
Figure 2:
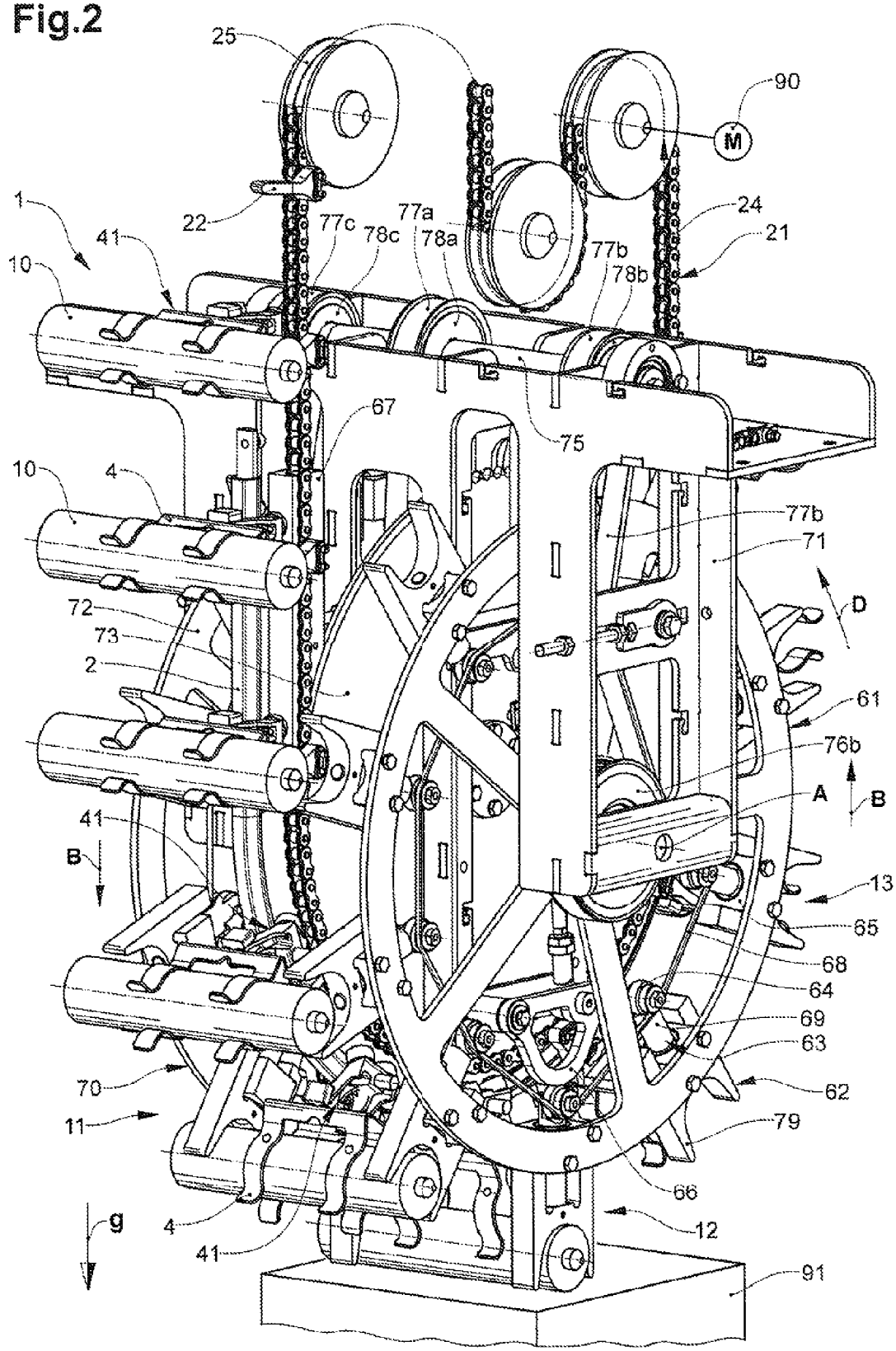
FIG. 2 shows a perspective view of a conveying apparatus according to the invention in the region of the discharging device.

FIG. 1 shows a conveying vehicle 41, which is guided along a guide rail 2, of an overhead conveyor which is realized as a gravity conveyor, as can be used, for example, in a conveying apparatus 1 according to the invention according to FIG. 2.

The conveying vehicle 41 is realized as an outside runner. This means that the conveying vehicle 41 is arranged around the guide rail 2. The conveying vehicle 41 includes a basic body 42 with a first and second vehicle limb 43, 44, both of which are connected together by means of a connecting portion 45.

A pair of first rollers 46 is arranged in a rotatably mounted manner on the end portion of the first vehicle limb 43. A pair of second rollers 47 is arranged in a rotatably mounted manner on the end portion of the second vehicle limb 44. The rollers 46, 47 of the named roller pairs are arranged one behind another in each case in the direction of movement B. The arrangement of the first and second rollers 46, 47 in pairs is to prevent the conveying vehicle 41 from tipping up in the direction of movement B.

A single third roller 48 is arranged in a rotatably mounted manner on the connecting portion 45. The first, second and third rollers are arranged at an angle to one another.

The two vehicle limbs 43, 44 realize a rail receiving space 49, through which the guide rail 2 is guided. The guide rail 2 is a symmetrical hexagonal profile. The outside faces 50 of the profile realize the running surfaces for the rollers 46, 47, 48. The guide rail can, however, be realized in general as a polygonal profile or simply as a round profile.

Just one first roller can also be provided in place of two first rollers 46. Just one second roller can also be provided in place of two second rollers 47. Two third rollers can also be provided in place of just one third roller 48. Arbitrary combinations are possible. In addition, there can also be more than two first, second and/or third rollers provided arranged one behind another.

A holding clip 4 is arranged on the outside of the connecting portion 45 for receiving and supporting a piece goods item in a clamping manner.

The holding clip 4 is arranged below the guide rail 2 in an overhead conveying system. The two vehicle limbs 43, 44 are guided upward at the side of the guide rail 2 from below.

The holding clip 4 includes a pair of first clip limbs 51 and a pair of second clip limbs 52 that enclose a receiving space 53 for the piece goods item 10.

The holding clip 4 is formed of spring steel. As a result of forcing the clip limbs 51, 52 apart, the piece goods item 10 can be guided into the receiving space 53 or out of said receiving space. The resilient clip limbs 51, 52 hold the piece goods item 10 in a clamping manner in the receiving space 53 by means of their resetting force.

A contact journal 5, which protrudes transversely with respect to the direction of movement B or to the longitudinal direction of the guide rail 2, is arranged in each case on the side of the first and second vehicle limbs 43, 44 for producing a guiding contact with entrainment means 22.

If the entrainment means 22 is arranged in a leading manner in the direction of movement B in relation to the conveying vehicles 41, it thus realizes a holding-back contact with the contact journal 5. If the entrainment means 22 is arranged in a trailing manner in the direction of movement B in relation to the conveying vehicle 41, it thus realizes an entraining contact with the contact journal 5 (see FIG. 2).

When viewed in the direction of movement B, the conveying vehicle 41 additionally includes on the front and rear side stop elements 54, which damp impacts when two conveying vehicles 41, which are moved independently of one another, collide. The stop elements 54 are in particular journals made of rubber elastic material. The stop elements 54 can have a damping effect.

Figure 3:
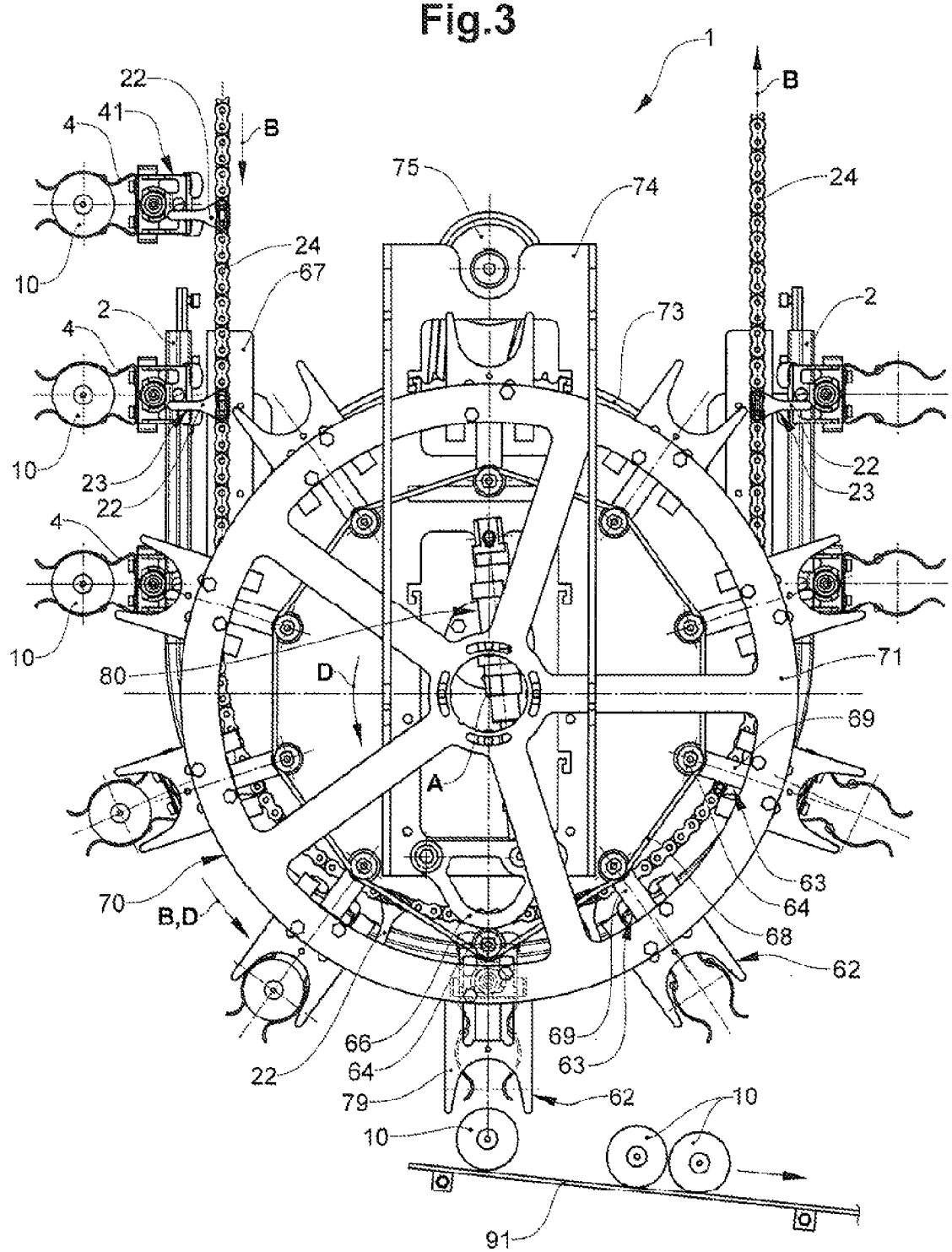
FIG. 3 shows a side view of the conveying apparatus in the region of the discharging device according to FIG. 2.

FIGS. 2 to 5 show a conveying apparatus 1 according to the invention in the region of the discharging device 61. FIG. 2 shows a perspective view of the discharging device 61 briefly prior to the discharging of a piece goods item 10. FIG. 3 shows a side view of the same discharging device 6 briefly after the discharging of a piece goods item 10.

Figure 4:
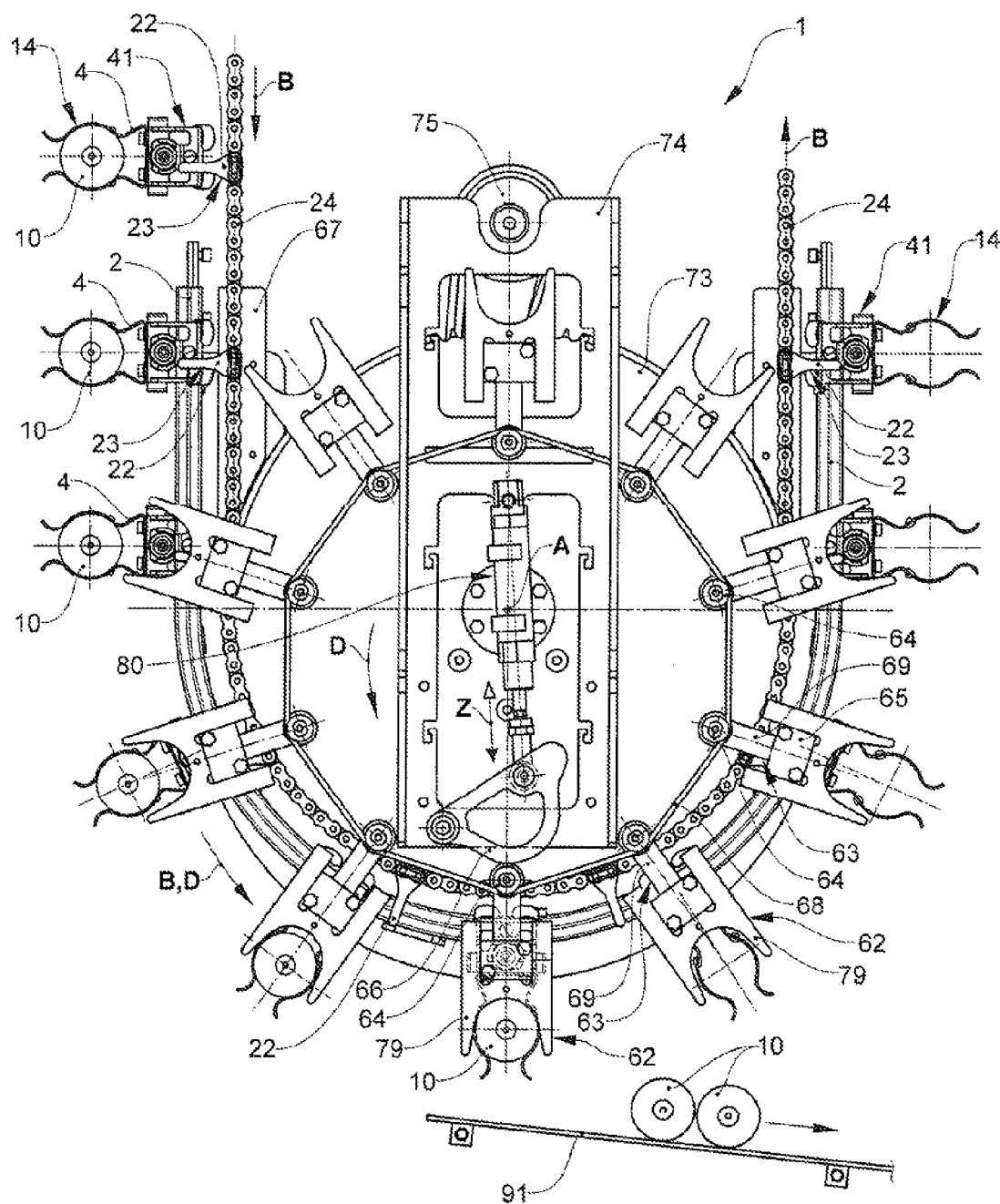
FIG. 4 shows a side view of the conveying apparatus in the region of the discharging device according to FIG. 3, leaving out a rotatable wheel plate of the wheel module, briefly prior to the discharging of a piece goods item.
Figure 5:
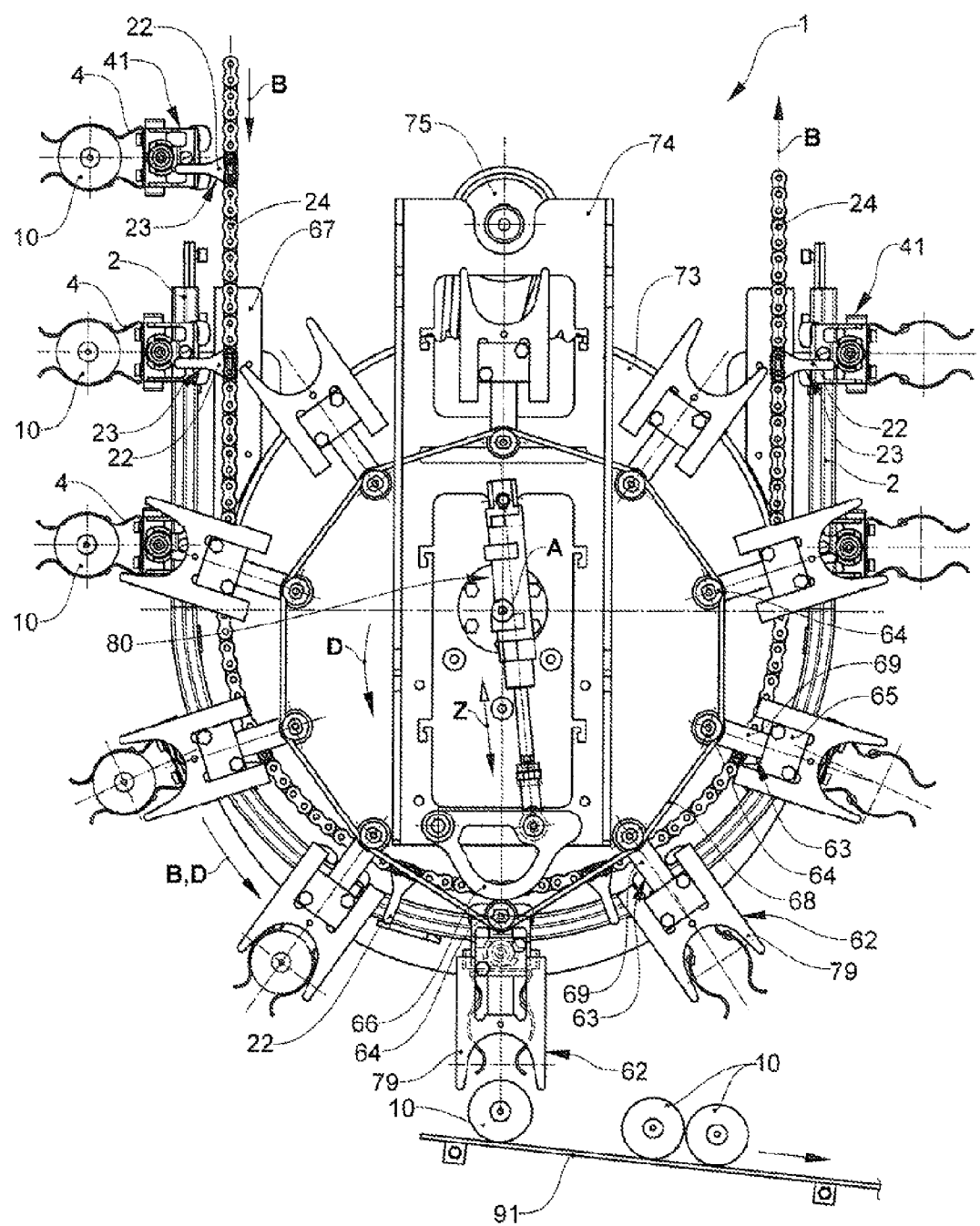
FIG. 5 shows a side view of the conveying apparatus in the region of the discharging device according to FIG. 3 leaving out a rotatable wheel plate of the wheel module, briefly after the discharging of a piece goods item.

FIGS. 4 and 5 also show a side view of the same discharging device 61 but for representational reasons, however, without the wheel plate 71. The ejecting bodies 62, which are mounted on the wheel plate 71 are shown, however, for illustration purposes. The difference in the representation between FIGS. 4 and 5 is that FIG. 4 shows a snapshot briefly prior to discharging a piece goods item 10 and FIG. 5 shows a snapshot briefly after discharging the piece goods item 10.

The conveying apparatus 1 is a gravity conveyor with a plurality of conveying vehicles 41 according to FIG. 1 that are moved along a guide rail 2 by means of rollers. Other embodiments of conveying vehicles 41 and rail guiding means are also possible.

The conveying apparatus 1 includes a discharging device 61, which realizes an inlet region 11, a discharging region 12 and an outlet region 13, for the conveying vehicles 41 and the entrainment means 22. The guide rail 2 extends along the inlet region 11, the discharging region 12 and the outlet region 13 through the discharging device 61.

In addition, the conveying apparatus 1 includes an entraining device 21. The entraining device 21 includes a drive chain 24, on which entrainment means 22 are arranged at regular spacings with respect to one another. The entrainment means 22 include in each case an entraining finger 23, which protrudes outwardly transversely with respect to the drive chain 24 and to the direction of movement B. The drive chain 24 is driven by means of an entraining drive 25.

The drive chain 24 is guided in a chain guide 67 prior to the inlet region 11 and following the outlet region 13. The chain guide 67 realizes an open chain channel that prevents the drive chain 24 deflecting on account of forces that are transmitted by the entrainment means 22 to the drive chain 24.

The discharging device 61 includes a wheel module 70 that is mounted so as to be rotatable about a geometric rotational axis A. The wheel module 70 includes a first and second wheel plate 71, 72, which are arranged in a mirror-symmetrical manner with respect to one another on the geometric rotational axis A. A drive wheel 73, which is also mounted as to be rotatable about the common geometric rotational axis A, is arranged between the two wheel plates 71, 72.

The drive chain 24 is guided about the drive wheel 73 and realizes a positive locking contact with said drive wheel. The drive wheel 73 is driven by the drive chain 24. The drive wheel 73 is realized in the present exemplary embodiment as a toothed wheel and realizes a driving positive locking fit with the drive chain 24.

Radially aligned ejecting bodies 62 are arranged along the outside circumference of the wheel plates 71, 72, in each case at regular spacings with respect to one another. Each ejecting body 62 includes an ejecting member 63 with a guide cylinder 69 that is guided so as to be movable in a guide bushing 65 of the ejecting body 62. The guide bushing 65 is fastened in a non-movable manner on the wheel plate 71, 72, for example, by means of screw connections.

The pitch of the ejecting bodies 62 on the wheel plate 71, 72 is chosen such that when the ejecting bodies are brought together with the entrainment means 22 or the conveying vehicles 41 at the start of the inlet region 11, one ejecting body 62 is always associated with one conveying vehicle 41 and they move synchronously in pairs toward the discharging region 12.

The wheel plates 71, 72 and the drive wheel 73 are in each case coupled rigidly with a transmission wheel 76a, 76b, 76c. The transmission wheels 76a, 76b, 76c are also arranged so as to be rotatable about the geometric rotational axis A. The discharging device 61 further includes a transmission shaft 75, which is arranged radially outside the wheel module 70.

The transmission wheel 76a of the drive wheel 73 is encircled by a first drive belt 77a. The first drive belt 77a, in turn, encircles a first transmission wheel 78a that is arranged on the transmission shaft 75 and is coupled with the same in a rigid manner.

A second transmission wheel 78b, which is arranged on the transmission shaft 75 and is rigidly coupled with the same, is encircled in each case by a second drive belt 77b. A third transmission wheel 78c, which is arranged on the transmission shaft 75 and is rigidly coupled with the same, is encircled in each case by a third drive belt 77c. The second drive belt 77b additionally encircles the transmission wheel 76b on the first wheel plate 71 and the third drive belt 77c additionally encircles the transmission wheel 76c on the second wheel plate 72.

The drive wheel 73, which is driven by the drive chain 24, for its part then drives the transmission shaft 75 by means of the first drive belt 77a and the transmission wheels 76a, 76b, 76c, which are arranged thereon. The two wheel plates 71, 72 are once again driven by the transmission shaft 75 by means of the drive belts 77b, 77c. By choosing the diameter of the transmission wheels 76, 77 and of the drive wheel 73 in a targeted manner, it is possible to establish a gear ratio that ensures that the releasing bodies 62 coincide in each case in a pulse-synchronous manner with an entrainment means 22 at the start of the inlet region 11.

The ejecting member 63 includes an ejecting element 79, which is arranged radially on the outside of the guide cylinder 69, as well as a cam roll 64, which is arranged radially on the inside of the guide cylinder. The ejecting element 79 includes a concave indentation that is adapted to the circumferential form of a cylindrical piece goods item 10.

A stationary control linkage 66 in the form of a cam disc, along which rolls the cam roll 64 of the ejecting member 63 of a passing ejecting body 62, is arranged in the discharging region 12. The control linkage 66 is arranged in such a manner that, when the cam roll 64 rolls along the control linkage 66, the ejecting member 63 is ejected radially outward against a resetting force. In this connection, the ejecting member 63 slides with its guide cylinder 69 in the guide bushing 65, which is non-movably arranged on the wheel plate 71, 72.

In the case of said movement operation, the ejecting element 79 impacts against the piece goods item 10, which is held in the holding clip 4 of the conveying vehicle 41, and ejects it completely out of the holding clip 4 with a progressive impacting movement.

As soon as the cam roll 64 leaves the range of influence of the control linkage 66, the ejecting member 63 is moved, brought about by a resetting force that acts on the ejecting member, from the maximum ejecting position back again into a starting position.

The resetting force is brought about by an elastic resetting belt 68, which circulates at the same time and abuts against the ejecting members 63. The resetting belt 68 is pre-stressed such that it pulls the cam rolls 64 and with them the ejecting members 63 toward the rotational axis A.

As elongated piece good items 10 with a longitudinal axis aligned transversely with respect to the direction of movement B are conveyed in the present exemplary embodiment, two wheel plates 71, 72, which are identical but are arranged in a mirror-symmetrical manner with respect to one another on both sides of the drive wheel 73, are provided with ejecting bodies 62, elastic resetting belts 68 and control linkage 66.

The ejecting bodies 62 of the two wheel plates 71, 72 are aligned radially with respect to one another and are guided synchronously with respect to one another along their circular movement path. The ejecting members 63 of the two wheel plates 71, 72 are also moved synchronously with respect to one another.

As a result, the elongated piece goods item 10 is ejected simultaneously at two points which are spaced apart from another by an ejecting element 79. If just one single ejecting element 79 is used, the piece goods item 10 would be at risk of tilting in the holding clip 4.

The control linkage 66 is fastened so as to be pivotable on a stationary supporting body 74 of the discharging device 61 by means of a pivot joint. The stationary supporting body 74 also supports the rotational axis of the wheel module 70.

In addition, an actuating cylinder 80 is mounted on the stationary supporting body 74. The actuating cylinder 80 is connected to the control device and is actuated by means of this latter. The actuating cylinder 80 is pivotably connected to the control linkage 66 by means of a pivot joint. The actuating cylinder 80 is a hydraulic or pneumatic cylinder.

As a result of extending the actuating cylinder 80 (forward stroke), the control linkage 66 is pivoted with its guide surface into the movement path of the cam roll 64, that is to say into the active position. The cam roll 64, which rolls over the guide surface of the control linkage 66, brings about an ejecting stroke of the ejecting member 63 and consequently of the ejecting element 79 (see FIG. 5).

As a result of retracting the actuating cylinder 80 (return stroke), the control linkage 66 is pivoted with its guide surface at least so far out of the movement path of the cam roll 64 that the latter does not bring about an ejecting stroke of the ejecting member 63. The control linkage 66 is situated in a non-active position. The cam roll 64, which is moved past the control linkage 66, correspondingly does not introduce any ejecting stroke of the ejecting member 63 nor consequently of the ejecting element 79 (see FIG. 4).

For the purpose of discharging the piece goods 10, the conveying vehicles 41 with the piece goods 10, driven by the force of gravity and independently of one another, roll along the guide rail 2 into the inlet region 11 of the discharging device 61. The guide rail 2 extends along a descent for this purpose.

The conveying vehicles 41, in this case, are held back from preceding entrainment means 22 by means of their contact journal 5 while forming a holding-back contact and are moved synchronously with the entrainment means 22.

The entrainment means 22 are arranged at regular spacings on the drive chain 24 and are moved correspondingly at the same speed. The conveying vehicles 41 are moved correspondingly at regular spacings and at a controlled speed into the inlet region 11.

The ejecting bodies 62 are moved into the inlet region 11 by the rotating wheel module 70. The individual ejecting bodies 62, in this case, coincide in each case in a pulse-synchronous manner with an entrainment means 22 and consequently with a conveying vehicle 41, which is held back by said entrainment means. In the case of said operation, the ejecting element 79 engages over the piece goods unit 10 with its recess and thus realizes a guiding means for the piece goods item 10 and consequently indirectly also for the associated conveying vehicle 41.

Conveying vehicles 41, entrainment means 22 and ejecting bodies 62 are moved along a common movement path B in the inlet region 11, in the discharging region 12 and in the outlet region 13.

In the inlet region 11, the conveying vehicles 41 are moved into the discharging region 12 by means of the piece goods 10, guided at the speed of the ejecting bodies 62. As the entrainment means 22 are moved more rapidly than the ejecting bodies 62 along the common movement path B, the entrainment means 22 are moved in the inlet region 11 and beyond in the direction of movement B away from the conveying vehicle 41 while terminating the holding-back contact with the following contact journal 5 of the associated conveying vehicle 41.

In the discharging region 12, the piece goods item 10 is ejected radially out of the holding clip 4 of the conveying vehicle 41 by the ejecting element 79 of the ejecting body 62. Here, the conveying vehicles 41 are situated at the lowest potential level. This means that the development of the guide rail 2 transfers at this point from a descent into an ascent. The guide rail 2 includes an arcuate development in said region.

With the ejecting of the piece good item 10 from the holding clip 4, the guiding contact with the ejecting body 62 is also lifted. The conveying vehicle 41 consequently stays in the discharging region until the following entrainment means 22 catches up with the conveying vehicle 41 and realizes an entraining contact with the leading contact journal 5 of the conveying vehicle 41.

The conveying vehicle 41 is then driven, i.e. entrained, by the entrainment means 22 following the discharging region 12, which means in the outlet region 13, and is moved to a higher potential level. Therefore, the conveying vehicle 41 is moved in the outlet region 13 with the speed of the entrainment means 22.

At the end of the outlet region 13, the ejecting bodies 62 are moved out of the outlet region 13 toward the inlet region 11 again. In this case, the ejecting bodies 62 are moved away from the conveying vehicles 41 by cancelling the guiding contact.

If then a piece goods item 10 is not discharged in the discharging region, the guide vehicle 41 is driven additionally by means of the ejecting body 62 in the outlet region 13 by maintaining the guiding contact. The guiding vehicle 41 is moved in the outlet region consequently at the speed of the ejecting body 62.

The speeds of the ejecting body 62 and of the following entrainment means 22 are therefore matched to one another in such a manner that the entrainment means catches up with the conveying vehicle 41 and realizes with the conveying vehicle 41 an entraining contact when the ejecting body 62 leaves the outlet region 13, and is consequently distanced from the conveying vehicle 41 while lifting the guiding contact.

The invention claimed is:

1. A conveying apparatus including:
    a plurality of conveying vehicles that can be moved along a movement path independently of one another for conveying piece goods;
    an entraining device with a plurality of entrainment members that can be moved along a movement path via an entraining drive;
    the plurality of conveying vehicles having contact elements for producing a guiding contact with the entrainment members, and the plurality of conveying vehicles having holding bodies for holding the piece goods;
        a discharging device for discharging piece goods from the conveying vehicles to a receiving device, said discharging device having a plurality of releasing bodies that can be moved along a closed movement path for releasing the piece goods out of the holding bodies in a discharging region;
    wherein in a direction of movement the discharging device realizes an inlet region, the discharging region and an outlet region,
    wherein the conveying apparatus is developed such that:
        the movement path of the conveying vehicles and of the entrainment members toward the inlet region extends along a descent such that the conveying vehicles can be held back from preceding entrainment members by the contact elements while forming a holding-back contact and can be moved in the direction of the discharging region in a synchronous manner with the entrainment members;
        the movement path of the conveying vehicles and of the entrainment members in the outlet region extends along an ascent such that, the contact elements of the conveying vehicles form an entraining contact with following entrainment members and thus the conveying vehicles can be moved away from the discharging region.

2. The conveying apparatus according to claim 1, wherein the holding bodies are clips.

3. The conveying apparatus according to claim 1, wherein the releasing bodies are ejecting bodies, which can be moved along a closed movement path for ejecting the piece goods out of the holding bodies in the discharging region.

4. The conveying apparatus according to claim 1, wherein each of the releasing bodies includes a contact member for producing a guiding contact with a conveying vehicle or with an item of the piece goods that is held by said conveying vehicle in the inlet region for moving the conveying vehicle into the discharging region in a manner guided synchronously with the releasing body.

5. The conveying apparatus according to claim 1, wherein the discharging device includes a driving device for driving the releasing bodies along the movement path, and the driving device is coupled with the entraining drive.

6. The conveying apparatus according to claim 1, wherein the releasing body includes a releasing member that is activatable by a stationary control linkage.

7. The conveying apparatus according to claim 1, wherein the entraining device includes a flexible driving element, which is driven in a rotating manner by the entraining drive and on which the entrainment members are mounted.

8. The conveying apparatus according to claim 1, wherein the movement path of the conveying vehicles is a curved path in the region of the discharging device and in the direction of movement of the conveying vehicles leads from a higher potential level in the inlet region to a lower potential level in the discharging region and from the lower potential level in the discharging region to a higher potential level in the outlet region.

9. The conveying apparatus according to claim 1, wherein the movement path of the conveying vehicles is realized by a guide rail, along which the conveying vehicles are movable.

10. The conveying apparatus according to claim 1, wherein the contact elements in each case realize a first contact zone for producing a holding-back contact with a preceding entrainment member and a second contact zone for producing an entraining contact with a following entrainment member.

11. A discharging device for a conveying apparatus according to claim 1, wherein the discharging device includes a releasing wheel module that is drivable about a rotational axis and on which releasing bodies are arranged.

12. The discharging device according to claim 11, wherein the discharging device includes a stationary control linkage for activating the releasing member of a releasing body in a discharging region.

13. A method for discharging piece goods in a conveying apparatus according to claim 1, comprising the steps of:
    moving the entrainment members and conveying vehicles with piece goods along an identically extending movement path into the inlet region of the discharging device, wherein the conveying vehicles that follow the entrainment members move into the inlet region in a guided manner at the speed of the entrainment members while forming a holding-back contact;

moving the entrainment members away from the following conveying vehicles in the inlet region and/or in the discharging region while cancelling the holding-back contact;

discharging the piece goods from the conveying vehicles to the receiving device in the discharging region of the discharging device following the inlet region;

moving the entrainment members, in each case, toward the preceding conveying vehicles while forming an entraining contact;

following the discharging region, forwarding the conveying vehicles in a guided manner by the entrainment members at the speed of the entrainment members by the entraining contact.

14. The method according to claim 13, wherein the conveying vehicles are moved in the discharging device along a movement path by a force of gravity from a higher potential level in the inlet region to a lower potential level in the discharging region and by the entrainment members from the lower potential level in the discharging region to a higher potential level following the discharging region.

15. The method according to claim 13, wherein:

conveying vehicles that follow entrainment members move into the inlet region in a guided manner at the speed of the entrainment members while forming a holding-back contact;

bringing the conveying vehicles together in the inlet region while forming a guiding contact with releasing bodies;

the releasing bodies moving the conveying vehicles into the discharging region in a guided manner at the speed of the releasing bodies by the guiding contact;

moving the entrainment members more rapidly than the releasing bodies such that in the inlet region the entrainment members are moved in the direction of movement, in each case, away from the following conveying vehicle while terminating the holding-back contact;

following the inlet region, discharging piece goods from conveying vehicles to the receiving device in the discharging region of the discharging device;

moving the entrainment members, in each case, toward the preceding conveying vehicle while forming an entraining contact;

following the discharging region, forwarding the conveying vehicles in a guided manner by the entrainment members at the speed of the entrainment members by the entraining contact.

16. The method according to claim 13, wherein the releasing bodies, the conveying vehicles and the entrainment members are moved along an identically extending movement path in the inlet region, in the discharging region and in the outlet region.

* * * * *